United States Patent
Coon et al.

(10) Patent No.: US 11,129,332 B2
(45) Date of Patent: Sep. 28, 2021

(54) CORN STALK ROLL ARRANGEMENT

(71) Applicant: Deere & Company, Moline, IL (US)

(72) Inventors: Steve A. Coon, Long Grove, IA (US); Nathan E. Krehbiel, Bettendorf, IA (US); Dennis P. Silver, Viola, IL (US)

(73) Assignee: DEERE & COMPANY, Moline, IL (US)

( * ) Notice: Subject to any disclaimer, the term of this patent is extended or adjusted under 35 U.S.C. 154(b) by 582 days.

(21) Appl. No.: 16/024,301

(22) Filed: Jun. 29, 2018

(65) Prior Publication Data

US 2020/0000036 A1    Jan. 2, 2020

(51) Int. Cl.
*A01D 45/02* (2006.01)
*A01D 43/08* (2006.01)
*A01F 11/06* (2006.01)

(52) U.S. Cl.
CPC ......... *A01D 45/025* (2013.01); *A01D 43/082* (2013.01); *A01F 11/06* (2013.01)

(58) Field of Classification Search
CPC ...... A01D 45/025; A01D 43/082; A01F 11/06
See application file for complete search history.

(56) References Cited

U.S. PATENT DOCUMENTS

| | | | | |
|---|---|---|---|---|
| 845,599 | A | * | 2/1907 | Weidner ............... A01D 45/025 460/31 |
| 901,989 | A | * | 10/1908 | Mcdole et al. ...... A01D 45/025 460/32 |
| 1,188,084 | A | * | 6/1916 | Kreitzer ................. A01F 11/06 460/33 |
| 1,464,564 | A | * | 8/1923 | Dueker ................. A01F 11/06 460/32 |
| 2,534,685 | A | * | 12/1950 | Shrader ............... A01D 45/025 460/27 |

(Continued)

FOREIGN PATENT DOCUMENTS

| | | | |
|---|---|---|---|
| DE | 9105932 U1 | * 7/1991 | .......... A01D 45/025 |
| DE | 19855526 C1 | * 6/2000 | .......... A01D 45/025 |

(Continued)

OTHER PUBLICATIONS

European Search Report issued in counterpart European Patent Application No. 19182143.8 dated Dec. 2, 2019 (9 pages).

*Primary Examiner* — Thomas B Will
*Assistant Examiner* — Joan D Misa
(74) *Attorney, Agent, or Firm* — Michael Best & Friedrich LLP (57) ABSTRACT

A corn harvester includes a first stalk roll having a plurality of first blades circumferentially spaced apart by a first angle. A second stalk roll has a plurality of second blades circumferentially spaced apart by a second angle. The first and second stalk rolls are rotatable about parallel first and second axes that are separated by a centerline therebetween. In an operational state when a tip of one first blade is aligned with the centerline, a tip of one second blade is angularly offset from the centerline by a third angle. The third angle is less than 45% of the second angle. The one first blade forms a cross section perpendicular to the first axis having an altitude extending from the tip toward the first axis along a first blade altitude. The cross section of the one first blade is asymmetric about the first blade altitude.

20 Claims, 10 Drawing Sheets

(56) References Cited

U.S. PATENT DOCUMENTS

| | | | | |
|---|---|---|---|---|
| 2,584,204 | A * | 2/1952 | Heth | A01D 45/025 460/27 |
| 2,668,543 | A * | 2/1954 | Stoddard | A01D 45/025 460/27 |
| 2,676,450 | A * | 4/1954 | Schaaf | A01D 45/025 56/66 |
| 2,768,626 | A * | 10/1956 | Pelowski | A01D 45/025 460/32 |
| 3,304,702 | A * | 2/1967 | Russell | A01D 45/025 56/104 |
| 3,832,836 | A * | 9/1974 | Anderson | A01D 45/025 56/104 |
| 3,858,384 | A * | 1/1975 | Maiste | A01D 45/025 56/14.2 |
| 4,233,804 | A * | 11/1980 | Fischer | A01D 45/025 56/104 |
| 4,974,402 | A * | 12/1990 | Ostrup | A01D 45/025 56/102 |
| 5,040,361 | A * | 8/1991 | Briesemeister | A01D 45/025 56/52 |
| 5,212,935 | A * | 5/1993 | Sanders | A01D 45/021 56/103 |
| 5,404,699 | A | 4/1995 | Christensen et al. | |
| 5,787,696 | A * | 8/1998 | Wiegert | A01D 45/021 56/104 |
| 6,050,071 | A * | 4/2000 | Bich | A01D 45/025 56/104 |
| 6,216,428 | B1 | 4/2001 | Becker et al. | |
| 7,373,767 | B2 | 5/2008 | Calmer | |
| 7,886,510 | B2 * | 2/2011 | Calmer | A01D 45/025 56/104 |
| 7,992,371 | B2 * | 8/2011 | Rieck | A01D 45/025 56/104 |
| 9,560,804 | B1 * | 2/2017 | Calmer | A01D 45/025 |
| 9,668,414 | B2 * | 6/2017 | Calmer | A01D 45/025 |
| 10,039,232 | B2 * | 8/2018 | Calmer | A01D 45/025 |
| 10,172,286 | B2 * | 1/2019 | Schloesser | A01D 45/025 |
| 10,537,058 | B2 * | 1/2020 | Ehle | A01D 34/44 |
| 10,785,911 | B2 * | 9/2020 | Calmer | A01D 45/025 |
| 2012/0204528 | A1 | 8/2012 | Regier | |
| 2017/0172067 | A1 | 6/2017 | Calmer | |
| 2017/0311542 | A1 | 11/2017 | Ehle | |

FOREIGN PATENT DOCUMENTS

| | | | |
|---|---|---|---|
| DE | 102005050470 B3 | 12/2006 | |
| DE | 102017124322 A1 * | 4/2019 | A01D 45/025 |
| EP | 0943229 A1 * | 9/1999 | A01D 45/025 |
| EP | 3586599 A1 * | 1/2020 | A01D 43/082 |
| FR | 2941593 | 8/2010 | |
| WO | 2019092276 A1 | 5/2019 | |
| WO | WO-2020025236 A1 * | 2/2020 | A01D 45/02 |

\* cited by examiner

CORN STALK ROLL ARRANGEMENT

BACKGROUND

The present disclosure relates to corn stalk rolls for a corn harvester.

SUMMARY

In one embodiment, the disclosure provides a stalk roll assembly for a corn harvester that includes a first stalk roll having a first elongate cylinder and a plurality of first blades, in which each first blade of the plurality of first blades is circumferentially spaced around a perimeter of the first elongate cylinder from an adjacent first blade by a first angle, and the first stalk roll is rotatable about a first axis by a power source. A second stalk roll has a second elongate cylinder and a plurality of second blades, in which each second blade of the plurality of second blades is circumferentially spaced around a perimeter of the second elongate cylinder from an adjacent second blade by a second angle, and the second stalk roll is rotatable about a second axis parallel to the first axis by the power source. A first plate is positioned above the first stalk roll, and a second plate is positioned above the second stalk roll. The first and second stalk rolls are spaced apart to separate corn ears from corn stalks. The first and second axes are separated by a centerline therebetween. In an operational state when a tip of one first blade of the plurality of first blades is aligned with the centerline, a tip of one second blade of the plurality of second blades is angularly offset from the centerline by a third angle. The third angle is less than 45% of the second angle. The one first blade forms a triangle with a cross section perpendicular to the first axis and has an altitude extending from the tip and forming a first base angle and a second base angle. The first base angle is at least 3° greater than the second base angle.

In another embodiment, the disclosure provides a corn harvester that includes a work vehicle configured to move along a ground surface and a crop divider configured to separate adjacent rows of corn stalks. A first stalk roll has a first elongate cylinder and a plurality of first blades, in which each first blade of the plurality of first blades is circumferentially spaced around a perimeter of the first elongate cylinder from an adjacent first blade by a first angle. The first stalk roll is rotatable about a first axis by a power source. A second stalk roll has a second elongate cylinder and a plurality of second blades, in which each second blade of the plurality of second blades is circumferentially spaced around a perimeter of the second elongate cylinder from an adjacent second blade by a second angle. The second stalk roll is rotatable about a second axis parallel to the first axis by the power source. A first plate is positioned above the first stalk roll and a second plate is positioned above the second stalk roll. The first and second stalk rolls are spaced apart to permit corn stalks to move between the first and second plates and to separate corn ears from corn stalks. A hopper is configured to store harvested corn ears. A conveyor is configured to move separated corn ears toward the hopper. The first and second axes are separated by a centerline therebetween, and in an operational state when a tip of one first blade of the plurality of first blades is aligned with the centerline, a tip of one second blade of the plurality of second blades is angularly offset from the centerline by a third angle. The third angle is less than 45% of the second angle. The one first blade forms a triangle with a cross section perpendicular to the first axis and having an altitude extending from the tip and dividing the cross-sectional angle thereof unequally.

In another embodiment, the disclosure provides a stalk roll assembly for a corn harvester that includes a first stalk roll having a first elongate cylinder and a plurality of first blades, in which each first blade of the plurality of first blades is circumferentially spaced around a perimeter of the first elongate cylinder from an adjacent first blade by a first angle. The first stalk roll is rotatable about a first axis by a power source. A second stalk roll has a second elongate cylinder and a plurality of second blades, in which each second blade of the plurality of blades is circumferentially spaced around a perimeter of the second elongate cylinder from an adjacent second blade by a second angle. The second stalk roll is rotatable about a second axis parallel to the first axis by the power source. A first plate is positioned above the first stalk roll, and a second plate is positioned above the second stalk roll. The first and second stalk rolls are spaced apart to permit corn stalks to move between the first and second plates and to separate corn ears from corn stalks. The first and second axes are separated by a centerline therebetween. In an operational state when a tip of one first blade of the plurality of first blades is aligned with the centerline, a tip of one second blade of the plurality of second blades is angularly offset from the centerline by a third angle. The third angle is less than 45% of the second angle. The one first blade forms a cross section perpendicular to the first axis having an altitude extending from the tip toward the first axis along a first blade altitude. The cross section of the one first blade is asymmetric about the first blade altitude.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
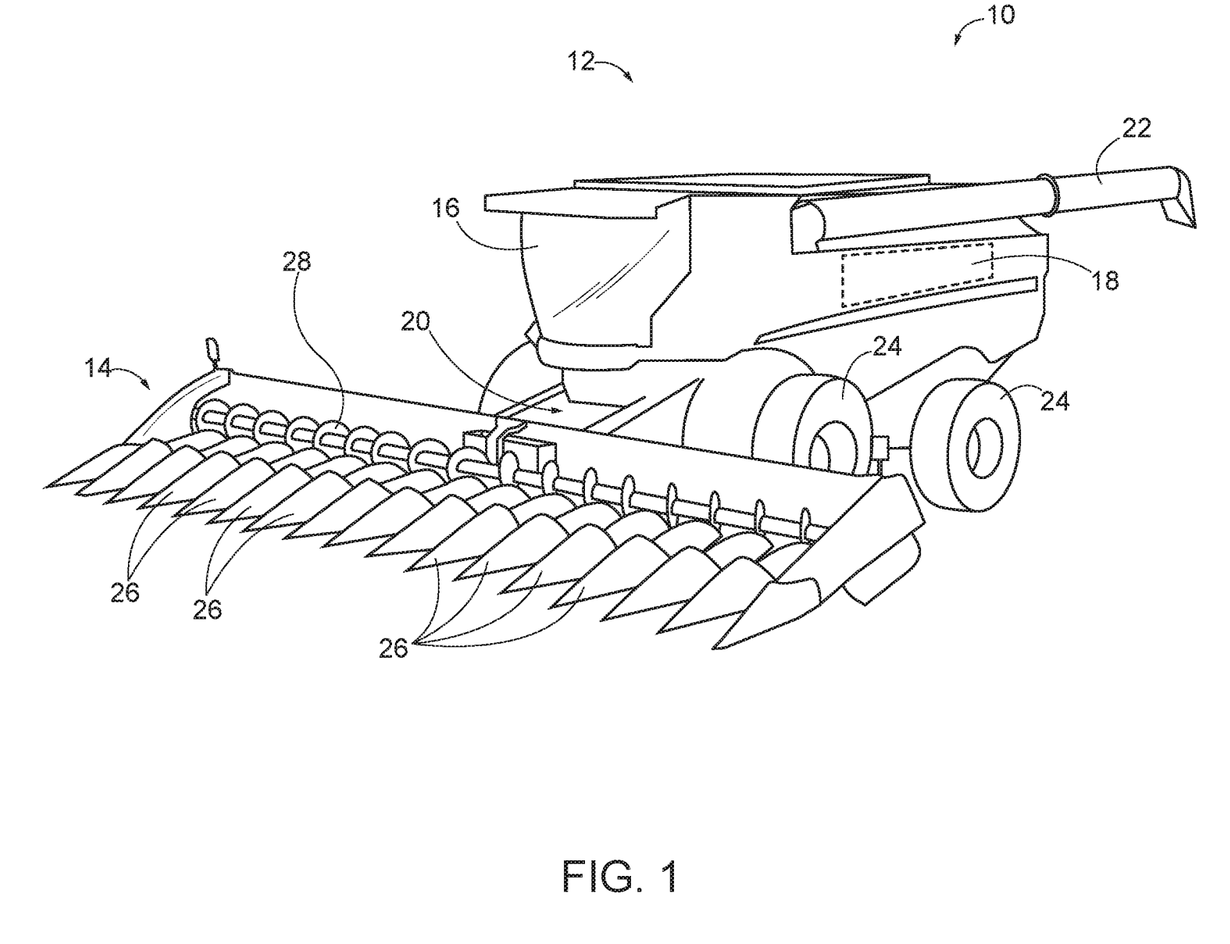
FIG. 1 is a perspective view of a corn harvester.

FIG. 1 illustrates a corn harvester 10 including a work vehicle 12 and a corn harvesting attachment 14. The illustrated work vehicle 12 includes an operator cab 16, an engine 18, a hopper 20, a dispensing chute 22, and a plurality of wheels 24. Other work vehicles can include tracks in place of the plurality of wheels. The illustrated corn harvesting attachment 14 includes a plurality of crop dividers 26 and a cross auger 28.

Figure 2:
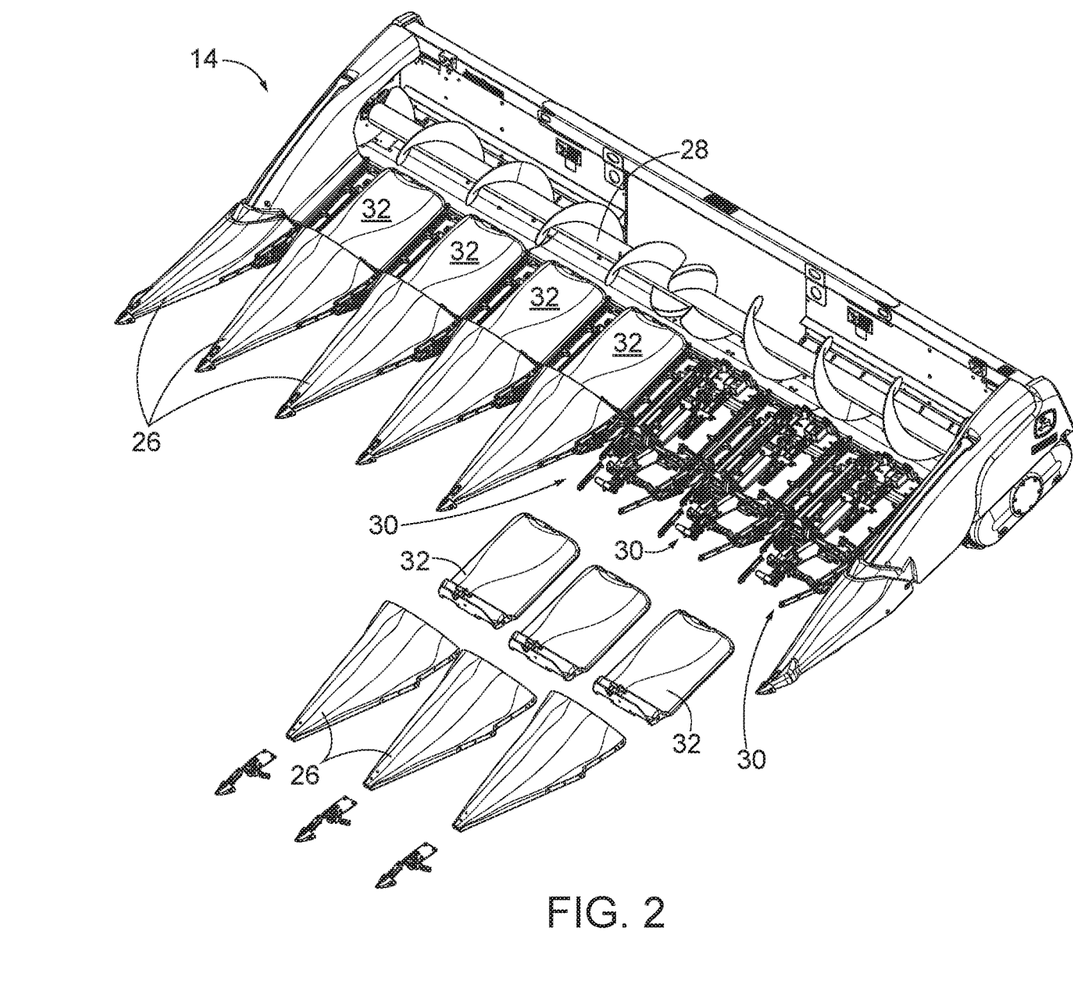
FIG. 2 is a perspective view of a corn harvesting attachment of FIG. 1.

FIG. 2 illustrates that each of the crop dividers 26 includes a cover 32 positioned behind the crop divider 26 and between two stalk roll assemblies 30 The crop divider 26 directs corn stalks toward one of the stalk roll assemblies 30. A stalk roll cover 32 is removed from some stalk roll assemblies 30 in FIGS. 2 and 3B.

Figure 3A:
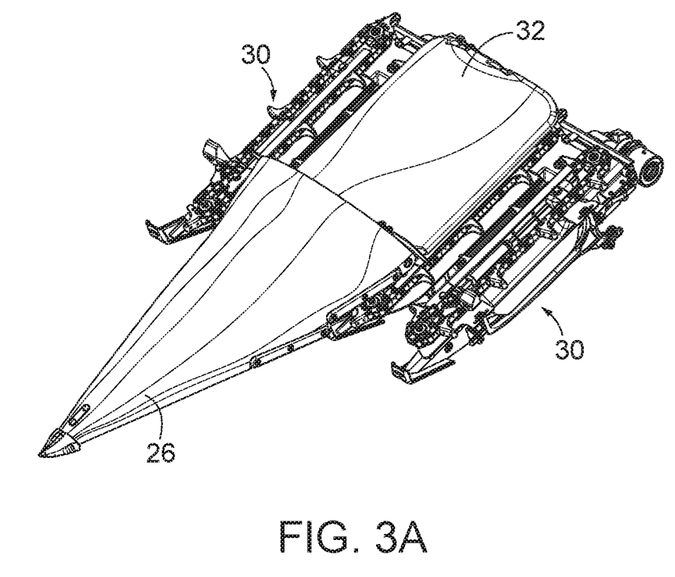
FIG. 3A is a perspective view of two corn stalk roll assemblies of the corn harvesting attachment of FIG. 2.
Figure 3B:
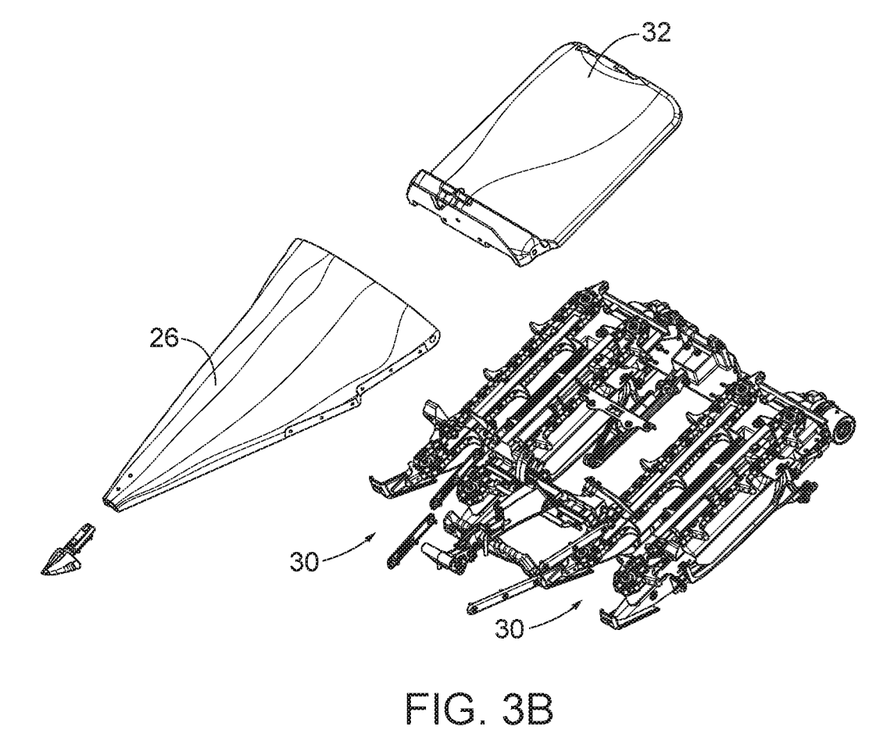
FIG. 3B is a partially exploded view of the corn stalk roll assemblies of FIG. 3A.

FIGS. 3A and 3B illustrate a pair of stalk roll assemblies 30 with a crop divider 26 and a cover 32 positioned between the pair of stalk roll assemblies 30. The cover 32 directs any harvested corn to the stalk roll assemblies 30 and inhibits any harvested corn from falling between the stalk roll assemblies 30 onto the ground.

Figure 4:
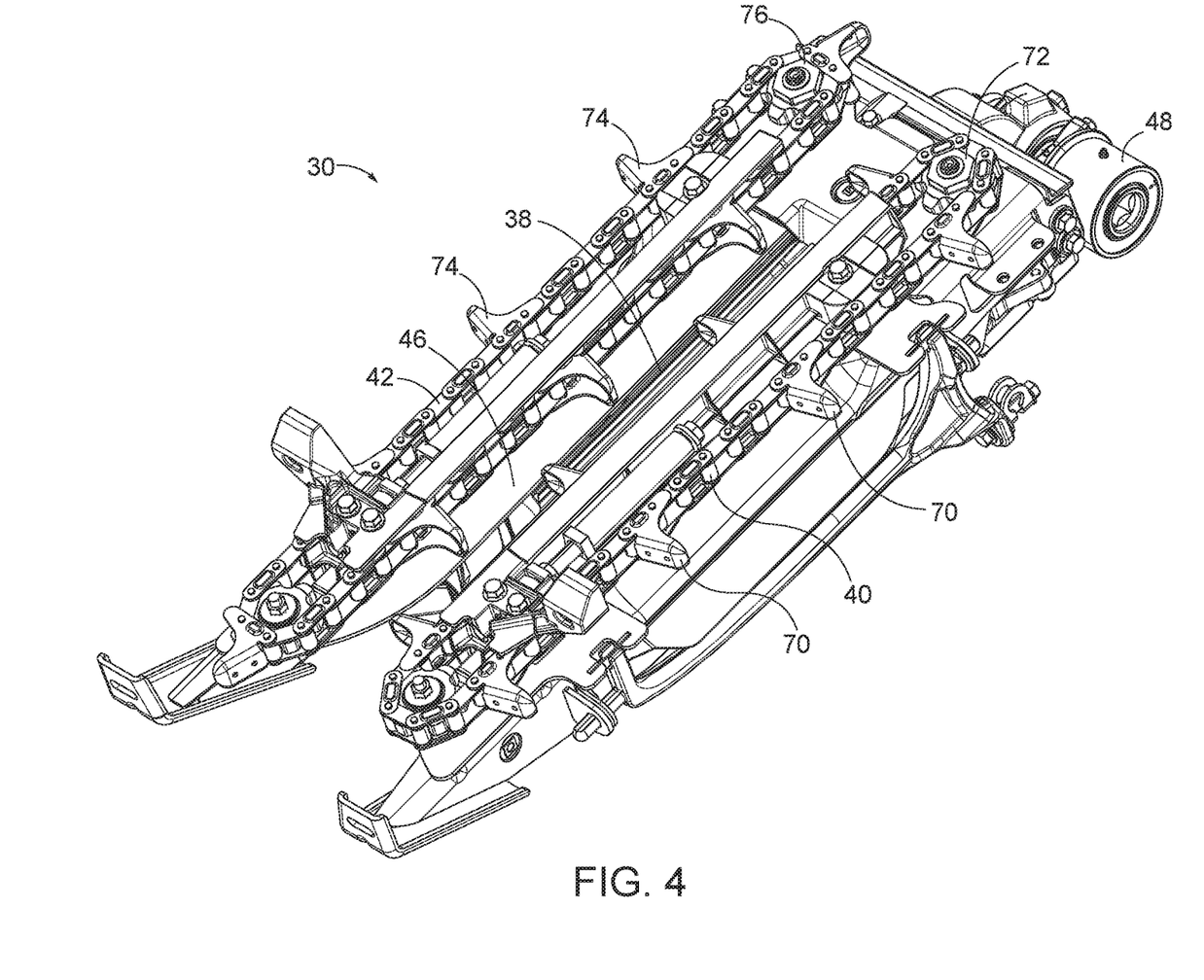
FIG. 4 is a top view of one corn stalk roll assembly.
Figure 5:
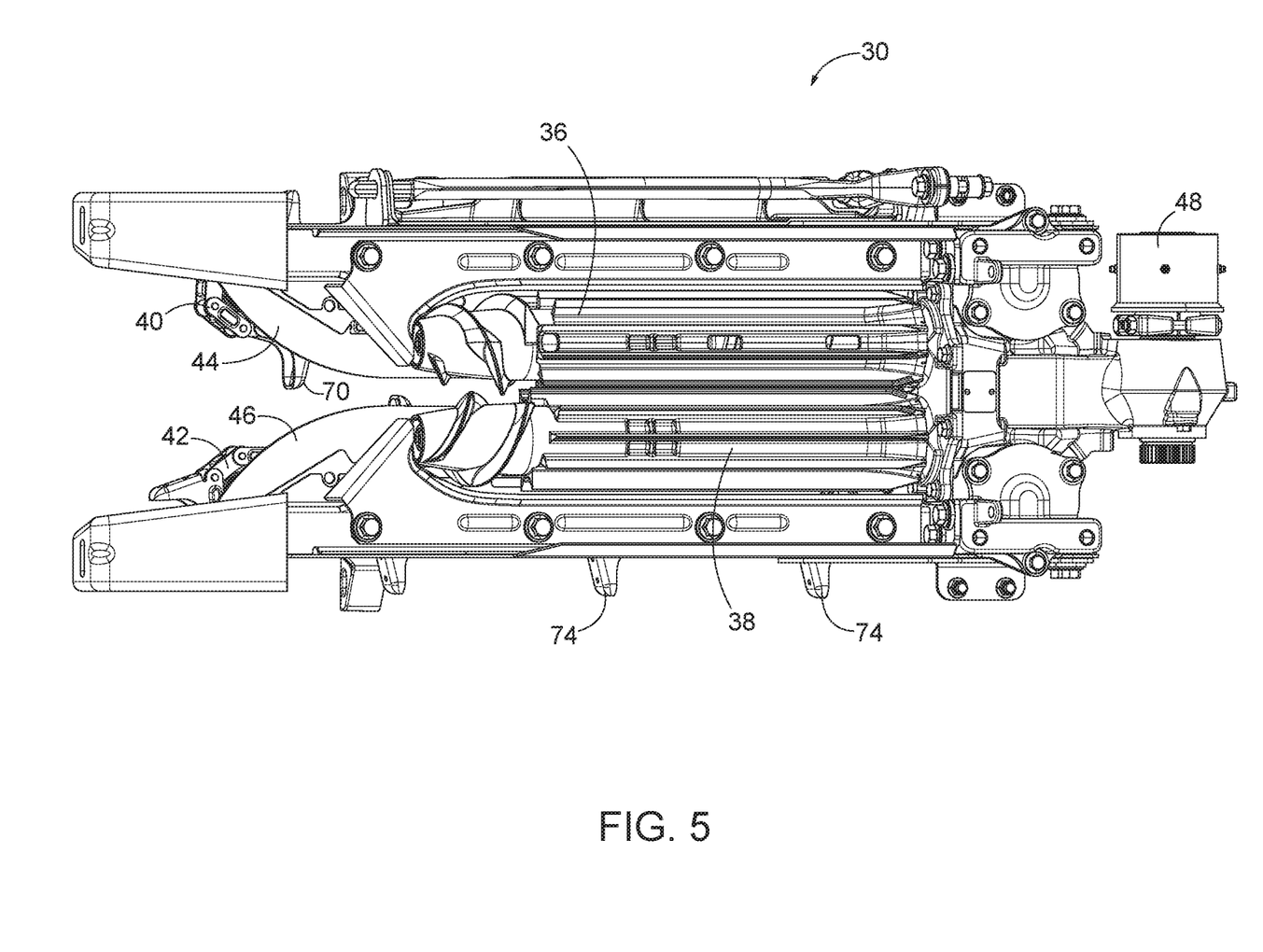
FIG. 5 is a bottom view of the corn stalk roll assembly of FIG. 4.
Figure 6:
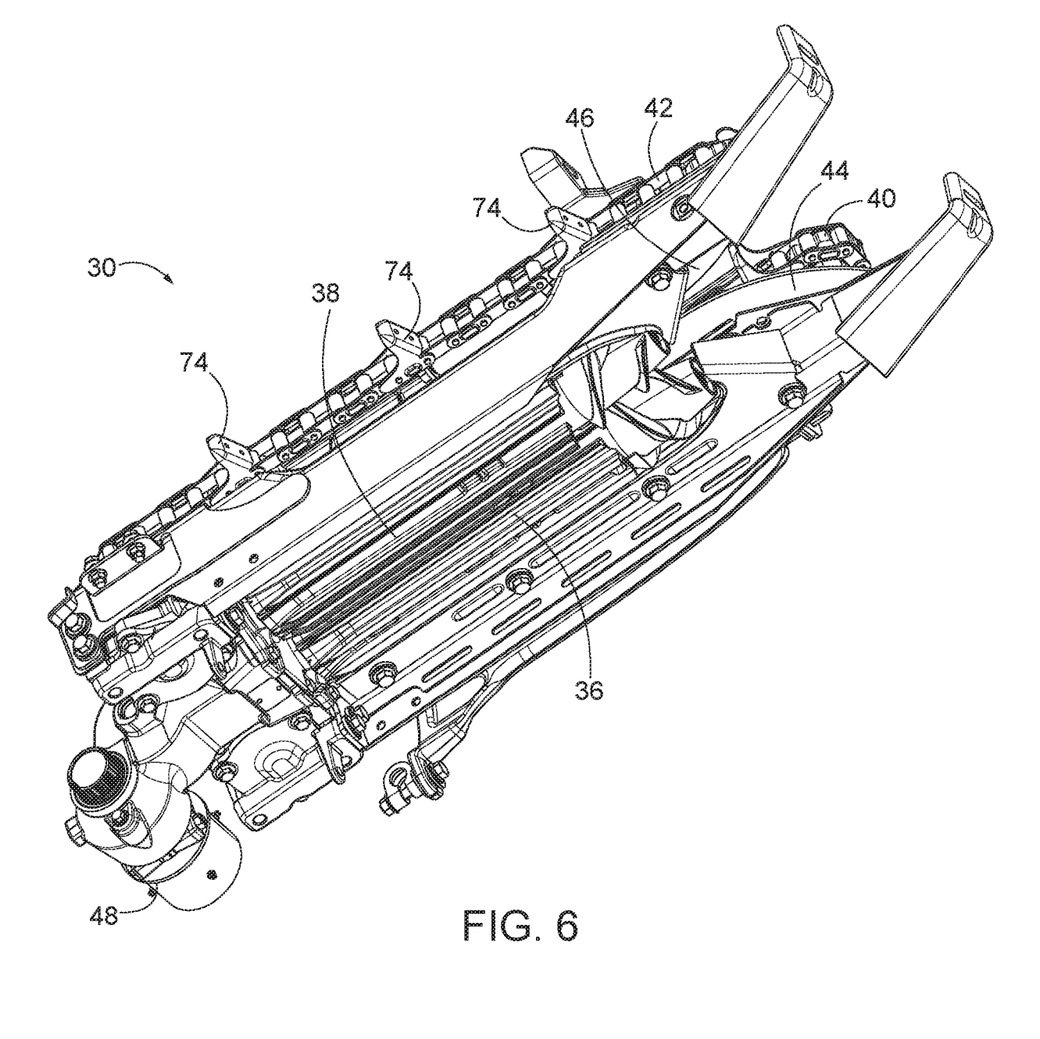
FIG. 6 is a bottom perspective view of the corn stalk roll assembly of FIGS. 4 and 5.

FIGS. 4-6 more clearly illustrate one such stalk roll assembly 30. The illustrated stalk roll assembly 30 includes a first stalk roll 36, a second stalk roll 38, a first gathering chain 40, a second gathering chain 42, a first plate 44, a second plate 46, and a power source 48.

Figure 7:
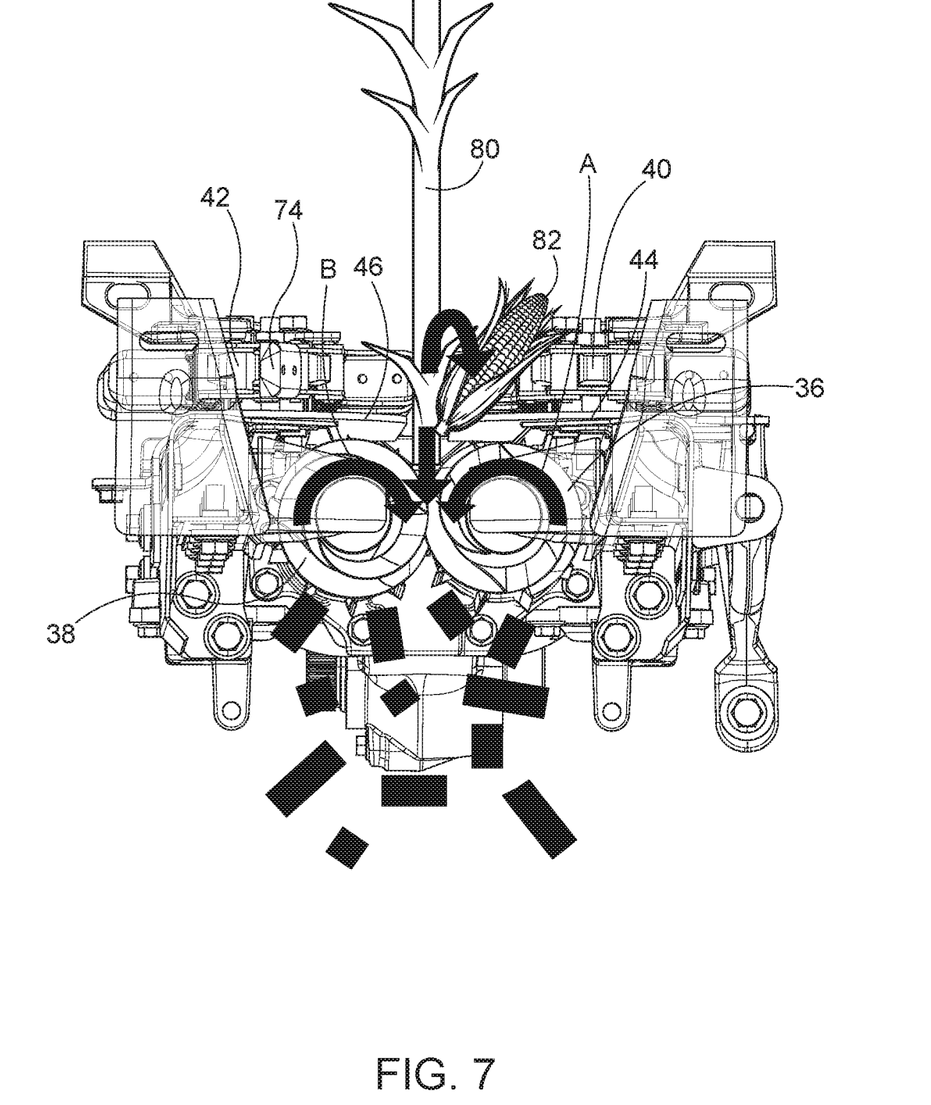
FIG. 7 is a schematic end view of the corn stalk roll assembly of FIGS. 4-6.
Figure 8:
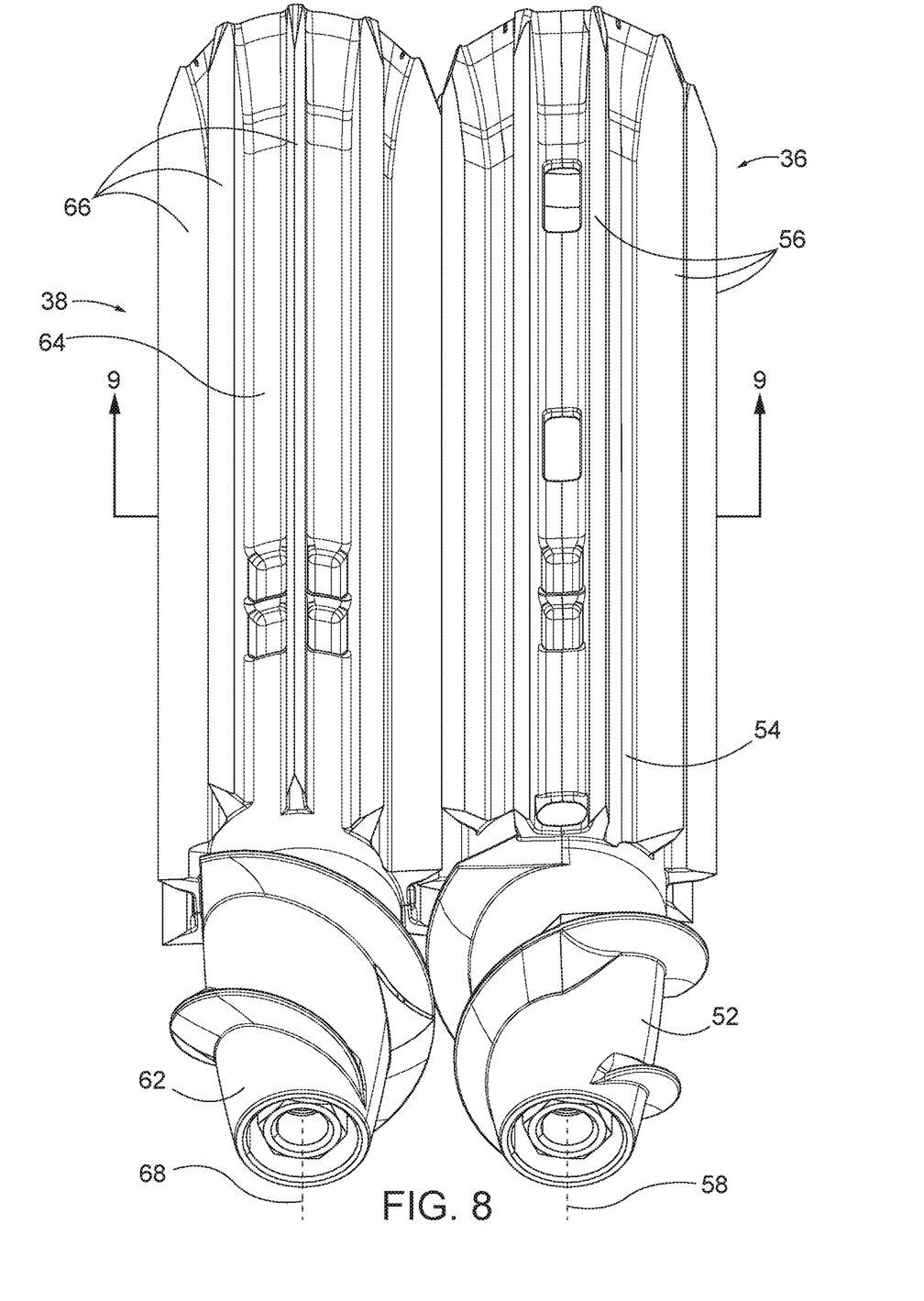
FIG. 8 is a perspective view of a pair of corn stalk rolls from the corn stalk roll assembly of FIGS. 4-7.

As shown most clearly in FIGS. 7 and 8, the illustrated first stalk roll 36 includes a frustoconical tip 52 having a helical blade, and a cylindrical portion 54 having a plurality of first blades 56 that extend along a circumference of the cylindrical portion 54 of the first stalk roll 36 in the axial direction. The first stalk roll 36 is configured to rotate about a first longitudinal axis 58 in response to the power source 48. As shown in FIG. 7, the illustrated first stalk roll 36 is rotated in the direction of arrow A, which is counter clockwise when viewed from the end with the frustoconical tip 52.

The illustrated second stalk roll 38 includes a frustoconical tip 62 having a helical blade and a cylindrical portion 64 having a plurality of second blades 66 that extend along a circumference of the cylindrical portion 64 of the second stalk roll 38 in the axial direction. The second stalk roll 38 is configured to rotate about a longitudinal axis 68 in response to the power source 48. As shown in FIG. 7, the illustrated second stalk roll 38 is rotated in the direction of arrow B, which is clockwise when viewed from the end with the frustoconical tip 62.

As shown most clearly in FIG. 4, the first gathering chain 40 includes a plurality of lugs 70 and is moveable in response to rotation of a drive sprocket 72. The power source 48 can cause rotation of the drive sprocket 72 and thus, movement of the lugs 70. The second gathering chain includes a plurality of lugs 74 and is moveable in response to rotation of a drive sprocket 76. The power source 48 can cause rotation of the drive sprocket 76 and thus, movement of the lugs 74.

With reference to FIGS. 4-7, the first plate 44 is positioned above the first stalk roll 36 and below the first gathering chain 40. The second plate 46 is positioned above the second stalk roll 38 and below the second gathering chain 42. The first plate 44 is spaced from the second plate 46 a distance that is greater than an average diameter of corn stalks but is less that an average diameter of harvested corn ears.

As shown most clearly in FIG. 7, the first stalk roll 36 rotates in the direction of arrow A and the second stalk roll 38 rotates in the direction of arrow B to draw a corn stalk 80 down and the plurality of first and second blades 56 and 66 cut the corn stalk 80 into pieces and dispense the pieces downward. Harvested corn ears 82 are retained on the first and second plates 44 and 46 and are thus stripped off of the corn stalk 80. The spacing between the first and second plates 44 and 46 permits the corn stalks to slide between the plates 44 and 46 but the first and second plates 44 and 46 retain harvested corn ears 82 on top of the plates 44 and 46.

With reference to FIGS. 2 and 4, the lugs 70 and 74 on the respective gathering chains 40 and 42 move the harvested corn ears 82 along the first and second plates 44 and 46 and toward the cross auger 28. The covers 32 retain the harvested corn ears 82 above the ground surface. As shown in FIG. 1, the cross auger 28 rotates to move harvested corn ears 82 toward the hopper 20. The corn kernels are then stripped off of the harvested corn ears 82 and are directed out the dispensing chute 22. A second work vehicle, such as a wagon, is positioned to receive the corn kernels from the dispensing chute 22.

Figure 9:
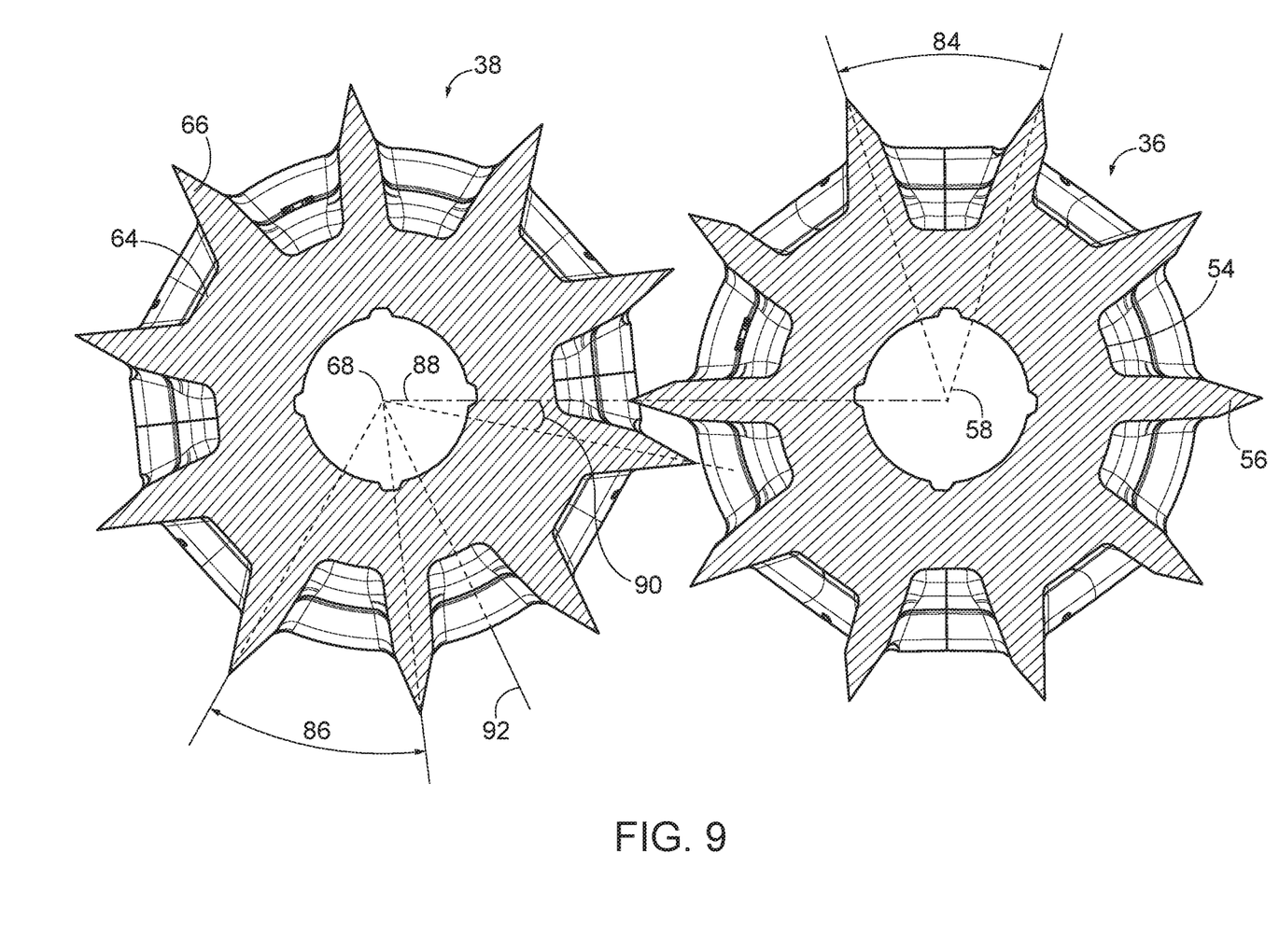
FIG. 9 is a cross-sectional view of the corn stalk rolls taken along line 9-9 of FIG. 8.

FIG. 9 illustrates the first stalk roll 36 and the second stalk roll 38 in greater detail. The first stalk roll 36 is configured to rotate about the first longitudinal axis 58. The first blades 56 are evenly circumferentially spaced around a circumference of the cylindrical portion 54. Each of the first blades 56 is spaced from adjacent first blades 56 by a first angle 84. In the illustrated embodiment, the first angle 84 is 36°. However, in other embodiments, other quantities of first blades 56 can be utilized which would alter the first angle 84 accordingly.

The second stalk roll 38 is configured to rotate about the longitudinal axis 68. The second blades 66 are evenly circumferentially spaced around a circumference of the cylindrical portion 64. Each of the second blades 66 is spaced from adjacent second blades 66 by a second angle 86. In the illustrated embodiment, the second angle 86 is 36°. However, in other embodiments, other quantities of second blades 66 can be utilized which would alter the second angle 86 accordingly.

The first longitudinal axis 58 is parallel to the second longitudinal axis 68 and is spaced apart from the second longitudinal axis 68 along a centerline 88. When one of the first blades 56 extends along the centerline 88 toward the second stalk roll 38, one adjacent second blade 66 is angularly offset from the centerline 88 by a third angle 90. The third angle 90 is less than 45% of the second angle 86. In some embodiments, the third angle 90 is between 10% and 40% of the second angle 86.

In the illustrated embodiment of FIG. 9, the third angle 90 is 12°. In contrast, a midline 92 is positioned halfway between the adjacent second blades 66. In the illustrated embodiment, the midline 92 is spaced 18° from the adjacent second blades 66 because the midline 92 is half of the second angle 86 (which is 36°). Therefore, the first blade 56 is offset from the midline 92 by 6°, which is the angle between the midline 92 and the adjacent second blade 66 (18°) minus the offset third angle (12°).

In some embodiments that include ten first blades 56 and ten second blades 66, the third angle 90 can be between 3° and 15°. In some embodiments that include ten first blades 56 and ten second blades 66, the third angle 90 can be between 5° and 13°. In some embodiments that include ten first blades 56 and ten second blades 66, the third angle 90 can be between 7° and 11°. In other embodiments, other quantities of first and second blades 56, 66 can be utilized which will alter the third angle accordingly.

Figure 10:
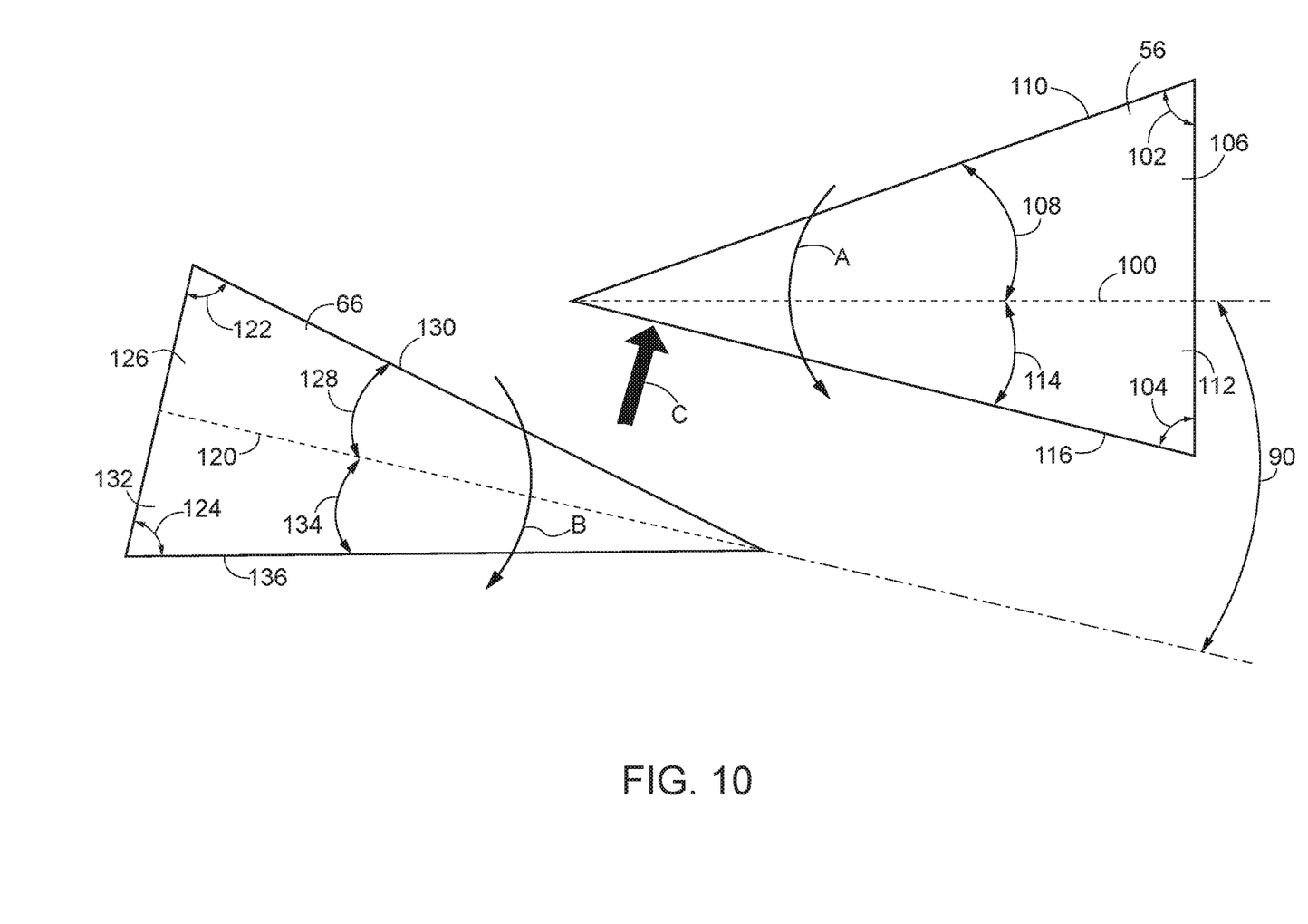
FIG. 10 is a close up view of a portion of the corn stalk rolls of FIG. 9.

FIG. 10 is a close up schematic view of one first blade 56 and one second blade 66 when the one first blade 56 and the one second blade 66 are positioned adjacent and configured to contact a corn stalk to cut said corn stalk into smaller pieces. The one first blade 56 is rotating in the direction of arrow A, and the one second blade 56 is rotating in the direction of arrow B (also shown in FIG. 7). Arrow C indicates the direction of the force acting on the first blade 56 when the first and second blades 56, 66 shear a corn stalk. The force shown by arrow C is acting on the first blade 56 to a greater extent than on the second blade 66 because of the offset between the blades 56, 66 and because of the direction of rotation of the first and second blades 56, 66. Therefore, in the field, the first blades 56 typically have a shorter operational lifespan than the second blades 66.

In order to increase the lifespan of the first blades 56, the size of the first blades 56 is increased. Specifically, the illustrated first blades 56 are triangular in cross-section and extend perpendicular to the first longitudinal axis 58. The illustrated one first blade 56 has an altitude 100 extending from the tip and forming a first base angle 102 and a second base angle 104. The first base angle 102 is at least 3° greater than the second base angle 104. In some embodiments, the first base angle 102 is at least 5° greater than the second base angle 104. In the illustrated embodiment, all the first blades 56 are identical.

The altitude 100 divides the one first blade 56 into a first portion 106 defining a fourth angle 108 between the altitude 100 and a first edge 110 of the first blade 56, and a second portion 112 defining fifth angle 114 between the altitude and a second edge 116 of the first blade 56. The altitude 100 divides the cross-sectional angle between the first edge 110 and the second edge 116 of the first blade 56 unequally. Namely, the cross section of the one first blade 56 is asymmetric about the first blade altitude 100.

In the illustrated embodiment, the fourth angle 108 is 22.5° and the fifth angle 114 is 17.5°. Other angles and ranges of angles are possible and are within the scope of the present disclosure. For example, the fourth angle 108 is between 10% and 50% greater than the fifth angle 114. In some embodiments, the fourth angle 108 is between 20% and 40% greater than the fifth angle 114.

The illustrated second blades 66 are triangular in cross-section and extend perpendicular to the second longitudinal axis 68. The illustrated one second blade 66 has an altitude 120 extending from the tip and forming a third base angle 122 and a fourth base angle 124. The third base angle 122 is substantially equal to the fourth base angle 124. In some embodiments, the third base angle 122 and the fourth base angle 124 are substantially equal to the second base angle 104. In the illustrated embodiment, all the second blades 66 are identical.

The altitude 120 divides the one second blade 66 into a first portion 126 defining a sixth angle 128 between the altitude 120 and a first edge 130 of the second blade 66, and a second portion 132 defining a seventh angle 134 between the altitude 120 and a second edge 136 of the second blade 66. The sixth angle 128 is substantially equal to the seventh angle 134. The altitude 120 divides the cross-sectional angle between the first edge 130 and the second edge 136 of the second blade 66 substantially equally. Namely, the cross section of the one second blade 56 is symmetric about the second blade altitude 120.

In the illustrated embodiment, the sixth angle 128 is 17.5° and the seventh angle 134 is 17.5°. In the illustrated embodiment, the fifth angle 114 is substantially equal to the sixth angle 128 and is substantially equal to the seventh angle 134.

Upon rotation of the first stalk roll 36 and the second stalk roll 38, the second edge 116 of the first blade 56 is configured to contact the corn stalks and the first edge 130 of the second blade 66 is configured to contact the corn stalks. The first blades 56 are sized and shaped to endure larger forces than the second blades 66 to increase the lifespan of the first blades 56.

Various features and advantages of the disclosure are set forth in the following claims.

What is claimed is:

1. A stalk roll assembly for a corn harvester, the stalk roll assembly comprising:
a first stalk roll having a first elongate cylinder and a plurality of first blades, each first blade of the plurality of first blades circumferentially spaced around a perimeter of the first elongate cylinder from an adjacent first blade by a first angle, the first stalk roll being rotatable about a first axis by a power source;
a second stalk roll having a second elongate cylinder and a plurality of second blades, each second blade of the plurality of blades circumferentially spaced around a perimeter of the second elongate cylinder from an adjacent second blade by a second angle, the second stalk roll being rotatable about a second axis parallel to the first axis by the power source;
a first plate positioned above the first stalk roll; and
a second plate positioned above the second stalk roll, the first and second stalk rolls being spaced apart to permit corn stalks to move between the first and second plates and to separate corn ears from corn stalks;
wherein the first and second axes are separated by a centerline therebetween, and
wherein in an operational state when a tip of one first blade of the plurality of first blades is aligned with the centerline, a tip of one second blade of the plurality of second blades is angularly offset from the centerline by a third angle wherein the third angle is less than 45% of the second angle, and
wherein the one first blade forms a cross section perpendicular to the first axis having an altitude extending from the tip toward the first axis along a first blade altitude, the cross section of the one first blade being asymmetric about the first blade altitude.

2. The stalk roll assembly of claim 1 wherein the one first blade forms a triangle with a cross section perpendicular to the first axis and having an altitude extending from the tip and forming a first base angle and a second base angle, the first base angle being at least 3° greater than the second base angle.

3. The stalk roll assembly of claim 2, wherein the centerline divides the one first blade into a first portion defining a fourth angle between the centerline a first edge of the first blade and a second portion defining fifth angle between the centerline and a second edge of the first blade, and wherein the fourth angle is between 10% and 50% greater than the fifth angle.

4. The stalk roll assembly of claim 3, wherein the fourth angle is between 20% and 40% greater than the fifth angle.

5. The stalk roll assembly of claim 3, wherein the first base angle is at least 5° greater than the second base angle.

6. The stalk roll assembly of claim 2, wherein in an operational state when a tip of the one second blade is aligned with the centerline, the centerline divides the one second blade into a first portion defining a sixth angle between the centerline and a first edge of the second blade and a second portion defining a seventh angle between the centerline and a second edge of the second blade, and wherein the sixth angle is substantially equal to the seventh angle.

7. The stalk roll assembly of claim 6, wherein the fifth angle is substantially equal to the sixth angle and is substantially equal to the seventh angle.

8. The stalk roll assembly of claim 6, wherein the one second blade forms a triangle with a cross section perpendicular to the first axis and having an altitude extending from the tip and forming a third base angle and a fourth base angle, the third base angle being substantially equal to the fourth base angle.

9. The stalk roll assembly of claim 2, wherein the third angle is between 10% and 40% of the second angle.

10. The stalk roll assembly of claim 1, wherein the one first blade forms a triangle with a cross section perpendicular to the first axis and having an altitude extending from the tip and dividing the cross-sectional angle thereof unequally.

11. The corn harvester of claim 10, wherein the centerline divides the one first blade into a first portion defining a fourth angle between the centerline a first edge of the first blade and a second portion defining fifth angle between the centerline and a second edge of the first blade, and wherein the fourth angle is between 10% and 50% greater than the fifth angle.

12. The corn harvester of claim 11, wherein the fourth angle is between 20% and 40% greater than the fifth angle.

13. The corn harvester of claim 11, wherein the second edge of the first blade is configured to contact the corn stalk upon rotation of the first stalk roll.

14. The corn harvester of claim 10, wherein in an operational state when a tip of the one second blade is aligned with the centerline, the centerline divides the one second blade into a first portion defining a sixth angle between the centerline and a first edge of the second blade and a second portion defining a seventh angle between the centerline and a second edge of the second blade, and wherein the sixth angle is substantially equal to the seventh angle.

15. The corn harvester of claim 14, wherein the fifth angle is substantially equal to the sixth angle and is substantially equal to the seventh angle.

16. The corn harvester of claim 14, wherein upon rotation of the first stalk roll and the second stalk roll, the second edge of the first blade is configured to contact the corn stalks and the first edge of the second blade is configured to contact the corn stalks.

17. The corn harvester of claim 10, wherein the third angle is between 10% and 40% of the second angle.

18. The stalk roll assembly of claim 1, wherein the first blade altitude divides the one first blade into a first portion defining a fourth angle between the first blade altitude and a first edge of the first blade and a second portion defining a fifth angle between the first blade altitude and a second edge of the first blade, and wherein the fourth angle is between 10% and 50% greater than the fifth angle.

19. The stalk roll assembly of claim 1, wherein in an operational state when a tip of the one second blade is aligned with the centerline, the centerline divides the one second blade into a first portion defining a sixth angle between the centerline and a first edge of the second blade and a second portion defining a seventh angle between the centerline and a second edge of the second blade, and wherein the sixth angle is substantially equal to the seventh angle.

20. The stalk roll assembly of claim 19, wherein the fourth angle is between 20% and 40% greater than the fifth angle, wherein the third angle is between 10% and 40% of the second angle, and wherein the fifth angle is substantially equal to the sixth angle and is substantially equal to the seventh angle.

\* \* \* \* \*

UNITED STATES PATENT AND TRADEMARK OFFICE
CERTIFICATE OF CORRECTION

PATENT NO. : 11,129,332 B2
APPLICATION NO. : 16/024301
DATED : September 28, 2021
INVENTOR(S) : Steve A. Coon, Nathan E. Krehbiel and Dennis P. Silver It is certified that error appears in the above-identified patent and that said Letters Patent is hereby corrected as shown below:

In the Claims

Claim 11, Line 1 (Column 7, Line 19), the text "The corn harvester" should be changed to --The stalk roll assembly--.

Claim 12, Line 1 (Column 7, Line 26), the text "The corn harvester" should be changed to --The stalk roll assembly--.

Claim 13, Line 1 (Column 7, Line 28), the text "The corn harvester" should be changed to --The stalk roll assembly--.

Claim 14, Line 1 (Column 7, Line 31), the text "The corn harvester" should be changed to --The stalk roll assembly--.

Claim 15, Line 1 (Column 8, Line 3), the text "The corn harvester" should be changed to --The stalk roll assembly--.

Claim 16, Line 1 (Column 8, Line 6), the text "The corn harvester" should be changed to --The stalk roll assembly--.

Claim 17, Line 1 (Column 8, Line 11), the text "The corn harvester" should be changed to --The stalk roll assembly--.

Signed and Sealed this
Twelfth Day of December, 2023

Katherine Kelly Vidal
*Director of the United States Patent and Trademark Office*